United States Patent
Velthoven et al.

(10) Patent No.: US 7,643,019 B2
(45) Date of Patent: Jan. 5, 2010

(54) EDGE DEPENDENT MOTION BLUR REDUCTION

(75) Inventors: Leo Jan Velthoven, Eindhoven (NL); Michiel Adriaanszoon Klompenhouwer, Eindhoven (NL); Gerard De Haan, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1106 days.

(21) Appl. No.: 10/515,076

(22) PCT Filed: May 21, 2003

(86) PCT No.: PCT/IB03/02293

§ 371 (c)(1), (2), (4) Date: Nov. 18, 2004

(87) PCT Pub. No.: WO03/100724

PCT Pub. Date: Dec. 4, 2003

(65) Prior Publication Data

US 2005/0190164 A1    Sep. 1, 2005

(30) Foreign Application Priority Data

May 23, 2002 (EP) .................................. 02076996

(51) Int. Cl.
*G06F 3/038* (2006.01)
*G09G 5/00* (2006.01)
*G06K 9/40* (2006.01)

(52) U.S. Cl. .................. 345/204; 382/266; 382/260

(58) Field of Classification Search ............. 345/100, 345/204; 382/164–308
See application file for complete search history.

(56) References Cited

U.S. PATENT DOCUMENTS

| 5,134,667 A | * | 7/1992 | Suzuki | 382/164 |
| 5,387,947 A | * | 2/1995 | Shin | 348/699 |
| 5,812,139 A | * | 9/1998 | Morimoto | 345/428 |
| 6,169,823 B1 | * | 1/2001 | Takeo et al. | 382/308 |
| 6,748,113 B1 | * | 6/2004 | Kondo et al. | 382/232 |
| 6,798,422 B2 | * | 9/2004 | Wang | 345/611 |

FOREIGN PATENT DOCUMENTS

| EP | 0657860 A2 | 6/1995 |
| EP | 657860 A2 * | 6/1995 |
| EP | 0657860 B1 | 6/1995 |
| EP | 0657860 A3 | 2/1997 |

* cited by examiner

*Primary Examiner*—Sumati Lefkowitz
*Assistant Examiner*—William L Boddie

(57) ABSTRACT

The invention relates to a method and a circuit arrangement to reduce motion blur of images shown in non-stroboscopic display devices, in particular Liquid Crystal Display Panels (LCDs). Thin Film Transistor Displays (TFTs), Color Sequential Displays. Plasma Display Panels (PDPs), Digital Micro Mirror Devices or Organic Light-Emitting Diode (OLED) displays, in which motion vectors depending on moving components in each image of an input video, signal are calculated, in which anti-motion blur filtering of the input video signal is performed based on the calculated motion vectors to produce an output video signal, and in which images are generated on said display device depending on said output video signal. In order to provide an improved spatial filtering with less noise enhancement and less noise modulation, it is proposed that edge characteristics in each image of the input video signal are determined and that anti-motion blur filtering is further based on said determined edge characteristics. In this way, spatial filtering is concentrated on significant parts of an image only, and both noise enhancement and noise modulation are reduced.

13 Claims, 2 Drawing Sheets

EDGE DEPENDENT MOTION BLUR REDUCTION

Figure 1:
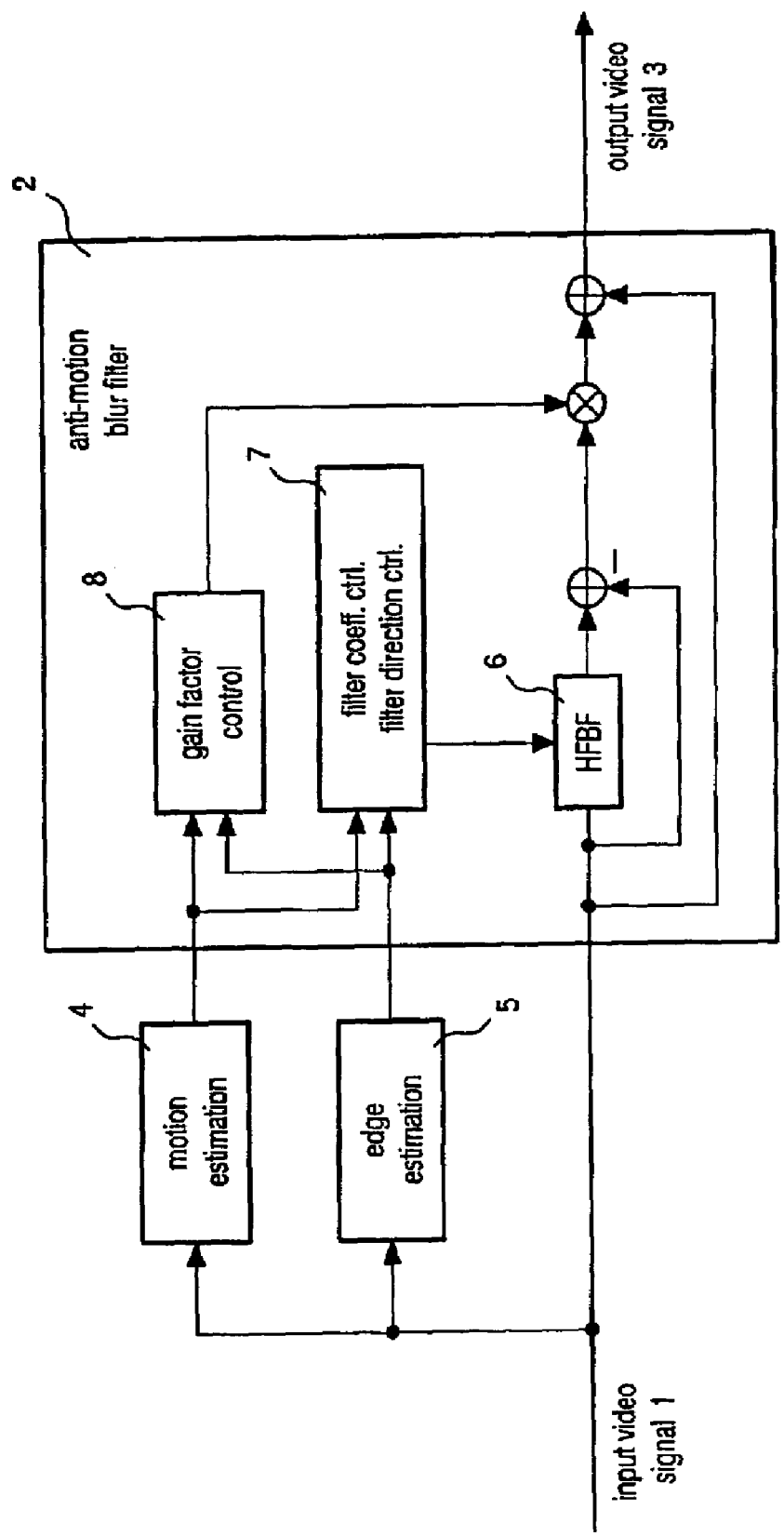

This invention relates to a method to reduce motion blur of images shown in non-stroboscopic display devices, in particular Liquid Crystal Display Panels (LCDs), Thin Film Transistor Displays (TFTs), Colour Sequential Displays, Plasma Display Panels (PDPs), Digital Micro Mirror Devices or Organic Light-Emitting Diode (OLED) displays, in which motion vectors depending on moving components in each image of an input video signal are calculated, in which anti-motion blur filtering of the input video signal is performed based on the calculated motion vectors to produce an output video signal, and in which images are generated on said display device depending on said output video signal. The invention further relates to a circuit arrangement providing anti motion blur functionality.

Non-stroboscopic displays, such as Liquid Crystal Displays (LCD), Plasma Panel Displays (PDP), Thin Film Transistor Displays (TFT), Colour Sequential Displays, Digital Micro Mirror Devices or Organic Light-Emitting Diode (OLED) displays consist of a display panel having a row and column array of picture elements (pixels) for modulating light, means for illuminating the display panel from the front or back side, and drive means for driving the pixels in accordance with an applied input video signal.

In state-of-the-art Cathode Ray Tubes (CRTs), each pixel of a displayed image is generated as a pulse, which is very short compared to the picture period T. Different to these state-of-the-art CRTs, in new flat, high quality, low cost displays devices, each pixel is displayed during most of the picture period. Of course, this non-stroboscopic behaviour also holds for types of CRTs whose pixels, e.g. slow phosphor atoms, are active for a time not negligible to the picture period. In the sequel of this description, we thus will only differentiate between stroboscopic and non-stroboscopic displays, and in case of a non-stroboscopic display, we will use the term "pixel" for both the elements of a light modulation an-ay and the activated (slow) atoms of a CRT-type display.

In case any part of the image displayed on a non-stroboscopic display contains motion, the viewer will track this motion. As each pixel is displayed substantially the whole picture period, the intensity of pixels showing the motion is integrated along the motion trajectory as follows:

$$F_{out}(\vec{x}, n) = \frac{1}{t_i} \int_0^{t_i} F\left(\vec{x} + \frac{t}{T}\vec{D}, n\right) dt \quad (1)$$

with $t_i$ as display time of each image, F as input video signal, $F_{out}$ as output video signal, and T as picture period. The motion vector $\vec{D} = \vec{v}\,T$ is the product of the object velocity $\vec{v}$ and the picture period T. In case $t_i$ is constant, the integration is the same as a convolution of $F(\vec{x}, n)$ and a sample-and-hold function $h(\alpha)$:

$$F_{out}(\vec{x}, n) = \frac{T}{t_i} \int_0^{t_i/T} F(\vec{x} + \alpha\vec{D}, n) d\alpha \quad (2)$$
$$= \int_{-\infty}^{\infty} F(\vec{x} + \alpha\vec{D}, n) \cdot h(\alpha) d\alpha$$

where $$h(\alpha) = \begin{cases} T/t_i, & 0 \leq \alpha \leq t_i/T \\ 0, & \text{otherwise} \end{cases} \quad (3)$$

is a 1D block function, oriented along the motion vector $\vec{D}$. It is therefore actually a 2D function $h(\vec{x})$, which has zero value outside the line segment $\vec{x} = k\vec{D}, 0 \leq k \leq t_i/T$, while the 2D integral area is normalized to 1. The 2D spatial Fourier transform is:

$$F_{out}(\vec{f}, n) = \int_{-\infty}^{\infty}\int_{-\infty}^{\infty} F_{out}(\vec{x}, n) e^{(-j2\pi\vec{x}\vec{f})} d\vec{x} \quad (4)$$
$$= F(\vec{f}, n) \cdot H(\vec{f})$$

with $F(\vec{f}, n)$ the 2D spatial Fourier transform of the original signal $F(\vec{x}, n)$, and $H(\vec{f})$ the 2D spatial Fourier transform of $h(\vec{x})$:

$$H(\vec{f}) = \frac{\sin\left(\pi\vec{D}\frac{t_i}{T}\vec{f}\right)}{\pi\vec{D}\frac{t_i}{T}\vec{f}}. \quad (5)$$

Apparently the effect of the motion tracking/temporal sample-and-hold characteristic is a low-pass filtering in the direction of the motion with a sinc-shaped frequency response, with a cut-off-frequency being inversely proportional to the quantity $t_i/T\,\vec{D}$.

From EP 0 657 860 A2 it is known that motion blur in non-stroboscopic displays can be pre-compensated by anti-motion blur filtering of the input video signal that drives the pixels of the display panel. In EP 0 657 860 A2, this anti-motion blur filtering is implemented with a high spatial frequency boosting filter based on estimated motion vectors. As the viewer of moving objects on a matrix display integrates the intensity of the pixels along the motion trajectory, which, according to equation 5, corresponds to a low pass filtering in the spatial frequency domain, motion blur may be reduced by enhancing high spatial frequencies of moving objects. The higher the speed of moving components, the larger the part of the spectrum that needs enhancement.

A drawback of the proposed solution is that in areas where the motion vector is not reliable, i.e. in areas where there exists little contrast, filtering may be carried out without improving the picture. Furthermore, filtering may even cause noise modulation. In this case flat parts of the picture are filtered where the filtering cannot improve significant detail. It can however, result in visible differences in noise patterns, i.e. noise modulation.

It is thus the object of the invention to provide an improved spatial filtering with less noise enhancement and less noise modulation.

To solve the object of the invention, it is proposed that edge characteristics in each image of the input video signal are determined and that anti-motion blur filtering is further based on said determined edge characteristics. In this way, spatial filtering is concentrated on significant parts of an image only, and both noise enhancement and noise modulation are reduced.

Edge characteristics such as length and/or orientation of edge vectors and/or the presence of an edge are further proposed for a preferred embodiment of the invention.

Said edge characteristics are preferably derived from zero-crossings of the absolute values of the first derivatives of the image signal in two orthogonal directions subtracted by fixed thresholds to reduce sensitivity to noise.

Low and narrow edges are preferably not considered in the calculation of length and orientation of said edge vectors.

The presence of edges is preferably detected by sampling the edge vectors into binary signals.

According to a further preferred embodiment of the invention, the presence of edges may be smoothed out over space by dilating and/or corroding and/or low-pass filtering said binary signals.

A further preferred embodiment of the invention proposes that anti-motion blur filtering is performed by filtering the input video signal with a spatial filter, by subsequently combining the filtered input video signal with the input video signal itself to produce an intermediate video signal, by multiplying the intermediate video signal with gain factors to produce an amplified intermediate signal, and by combining said amplified intermediate signal with said input video signal to produce an output video signal. In said multiplication, the applied gain factors can be pixel-specific or as well be constant for a group of pixels.

The spatial filter applied to the input video signal may be favourably implemented as a high spatial frequency boosting filter. This filter can be implemented as 1D filter to save costs and simplify signal processing, as a standard 2D filter or even as a 3D filter, if also image data from previous or next images is used in the filtering process.

In a further advantageous embodiment of the invention, the filter coefficients of the high spatial frequency boosting filter, which determine the type of filter characteristic such as low-pass, mid-pass or high-pass, and the direction of the frequency characteristic of this spatial filter depend on the motion vectors, whereas the gain factors depend on the length of the motion vectors and the presence of edges. Noise enhancement and noise modulation is then reduced by suppressing image processing in low detailed parts of the image where no improvement will be achieved. By using edge characteristics as a point of interest selector, discrimination in the amount of processing for various parts of the image can be made.

In a further preferred embodiment, the filter coefficients of the high frequency boosting filter and the direction of the frequency characteristic of the filter depend on the motion vectors, whereas the gain factors depend on the inner product of edge vectors and motion vectors normalized to the length of the edge vectors.

By gain control, image processing is then concentrated on parts of the image where the angle between the motion vector and the edge vector is small, reflecting the fact that a vertical luminance transient with corresponding vertical edge vector will not be affected by motion blur if the corresponding motion vectors are oriented in horizontal direction.

Yet another advantageous embodiment of the invention proposes that the direction of the frequency characteristic of the filter depends on the orientation of the edge vectors, that the filter coefficients of the high spatial frequency boosting filter depend on the motion vectors and/or the edge vectors, and that the gain factors depend on the motion vectors and/or the edge vectors. This directional control of image processing considers the fact that motion vectors can be unreliable due to the aperture problem, stating that large estimation errors occur for motion vector components parallel to edges. Motion estimation parallel to an edge is difficult because in contrast to perpendicular to an edge, parallel to an edge little or no detail is available for the motion vector estimation algorithm to work with. By performing anti-motion blur filtering in the direction of the edge vectors rather than in the direction of the motion vectors, motion blur is thus reduced with less noise enhancement and noise modulation.

A low-cost embodiment of the invention is achieved by proposing that a fixed set of filter coefficients for the high spatial frequency boosting filter is used, that the direction of the frequency characteristic of the spatial filter depends on the orientation of the edge vectors and that the gain factors depend on the motion vectors and/or the edge vectors. The high spatial frequency boosting filter then is vastly simplified, for only the direction of the frequency characteristic of the spatial filter depends on local image characteristics. The gain, which defines the parts of the image where image processing takes place, is controlled by both motion and edge vectors.

The dependence of gain factors on motion vectors and/or edge vectors may be preferably related to the length of the motion vectors and the presence of edges.

The dependence of gain factors on motion vectors and/or edge vectors may be further preferably related to the inner product of edge vectors and motion vectors normalized to the length of the edge vectors. Then anti-motion blur filtering is mainly performed in parts of the image where the angle between motion and edge vectors is small, i.e. only the part of the motion vector across an edge is used for sharpness enhancement.

The invention further comprises a non-stroboscopic display device, in particular a Liquid Crystal Display (LCD), Thin Film Transistor Display (TFT), Colour Sequential Display, Plasma Display Panel (PDP), Digital Micro Mirror Device or Organic Light-Emitting Diode (OLED) display with means to calculate motion vectors in each image of an input video signal, with means to filter the input video signal depending on said calculated motion vectors to produce an output video signal, and with means to display the images of the output video signal on a display panel, where means to determine the edge characteristics of each image of the input video signal are provided and where means to filter the input video signal depending on both the calculated motion vectors and the determined edge characteristics are provided.

Figure 2:
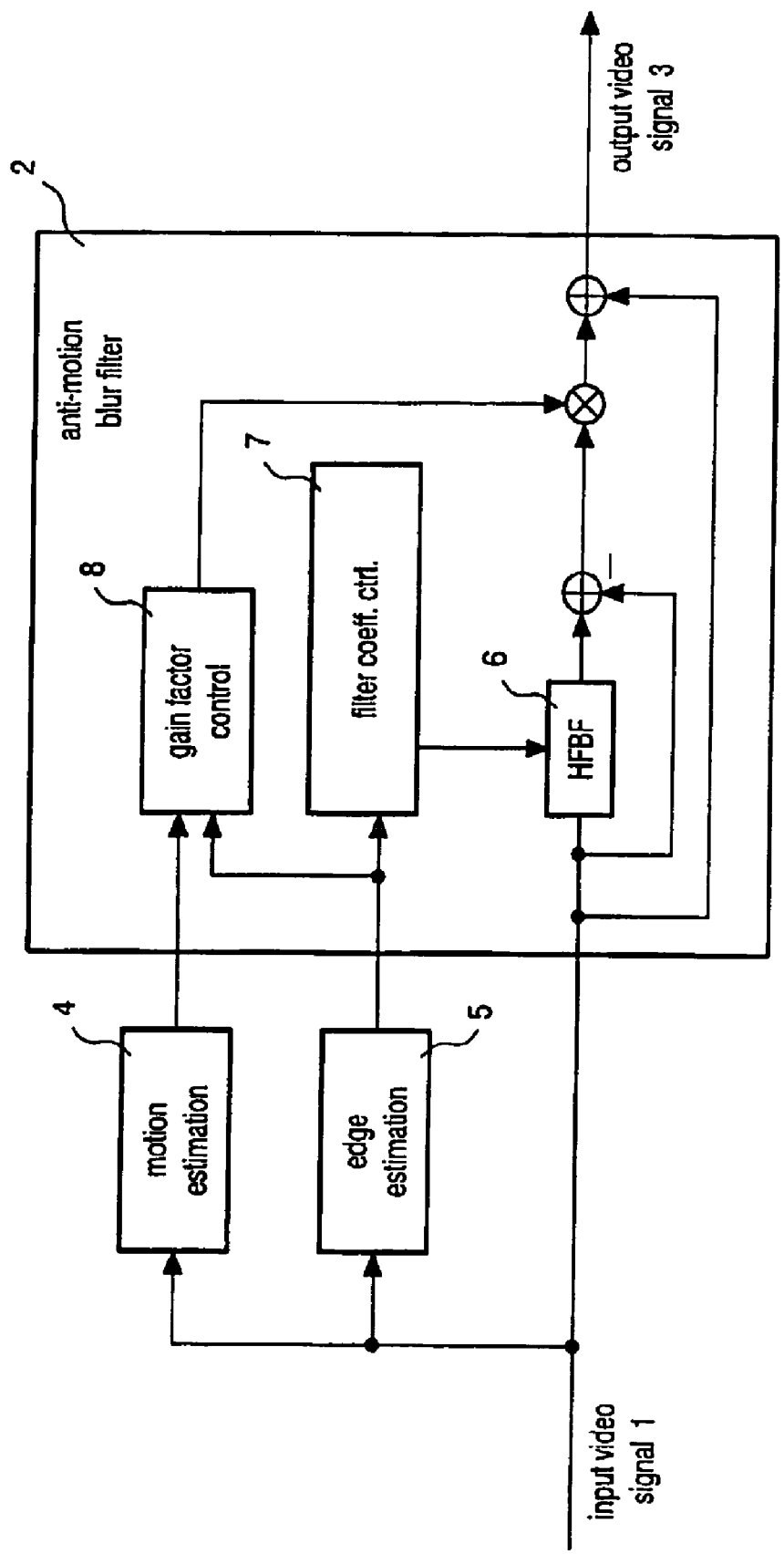

These and other aspects of the invention will be apparent from and elucidated with reference to the embodiments described hereinafter. In the figures show:

FIG. 1 a schematic representation of a first embodiment of a display system with edge-dependent motion blur reduction, and FIG. 2 a schematic representation of a second embodiment of a display system with edge-dependent motion blur reduction.

FIG. 1 depicts a first embodiment of a display system with the proposed edge-dependent reduction of motion blur. An input video signal 1 is filtered by an anti-motion blur filter 2 yielding an output video signal 3. To this aim, the input video signal 1 is fed into a motion estimation instance 4 and an edge estimation instance 5. The motion estimation instance 4 produces an estimate of the motion vectors of each image of the input video signal 1. The edge estimation instance calculates the edge vectors and/or determines the presence of edges in each image of the input video signal 1. The outcome of the motion 4 and edge 5 estimation instances is fed into the anti motion-blur filter 2.

Edges in each image of an input video signal can be determined by identifying luminance transients. To this end, the first derivatives of the luminance signal in both horizontal, $$Y'_h(\vec{x}) = \frac{d}{dx_1} Y(\vec{x}), \tag{6}$$

and vertical direction, $$Y'_v(\vec{x}) = \frac{d}{dx_2} Y(\vec{x}), \tag{7}$$

are calculated, where $$Y(\vec{x}) = Y(x_1, x_2) \tag{8}$$

is the two-dimensional luminance (image) signal.

The edge width in these directions can then be calculated by measuring the distance between zero crossings in the derivative signal (i.e. the width of the transient in both directions). To reduce sensitivity to noise, thresholds $T_h$ and $T_v$ can be subtracted from the absolute derivative signal.

The horizontal edge width $h(\vec{x})$ is the distance between zero crossings of the signal $$|Y_h'(\vec{x})| - T_h \qquad (9)$$

and the vertical edge width $v(\vec{x})$ is the distance between zero crossings of the signal $$|Y_v'(\vec{x})| - T_v. \qquad (10)$$

The edge width perpendicular to the edge is given by:

$$|\vec{e}(\vec{x})| = \frac{h(\vec{x}) \cdot v(\vec{x})}{\sqrt{h^2(\vec{x}) + v^2(\vec{x})}}. \qquad (11)$$

These widths are assigned to all points inside the edge (inside the zero crossings).

To increase further robustness against noise in the edge detection algorithm, the condition for $h(\vec{x})$ and similar for $v(\vec{x})$ can be used that:

$$h(\vec{x}) = \begin{cases} h(\vec{x}), \max(Y_h'(\vec{x})) > \dfrac{T_r}{h(\vec{x})} \forall \vec{x} \in \left[\vec{x} - \dfrac{h(\vec{x})}{2}, \vec{x} + \dfrac{h(\vec{x})}{2}\right] \\ 0, \text{ otherwise,} \end{cases} \qquad (12)$$

where $T_r$ denotes a fixed threshold.

This equation states that the width of an edge should be reverse proportional to its height, resulting in the discarding of low and narrow edges (probably noise). Having knowledge of the horizontal and vertical edge width, combined with the gradient of the edge in both directions (white to black or black to white), it is possible to calculate the orientation angle arg $(\vec{e})$ of the edge. Together with the edge width $|\vec{e}(\vec{x})|$ then the edge vector $\vec{e}(\vec{x})$ can be determined.

If the anti-motion blur filter is implemented based on a High Spatial Frequency Boosting Filter (HFBF) 6, as depicted in FIG. 1, the input video signal is processed as follows:

The input video signal 1 is first filtered with the HFBF 6 to produce a filtered input video signal. This filtered video signal is then combined with the input video signal 1 yielding an intermediate signal. The intermediate signal is subsequently multiplied with a gain factor k to produce an amplified intermediate signal, which then is combined with the input video signal 1 to produce the output video signal 3. The output video signal 3 then drives the row and column pixels of the display panel.

If the intermediate signal is produced by subtracting the input video signal from the filtered input video signal, it is evident that the difference of both signals only has non-zero components for spatial frequencies where filtering took place. The gain factor k allows to select if and to what extent this filtering is desired, e.g. to reduce the dynamic range of the amplified intermediate signal.

The HFBF 6 can now be characterized by a set of filter coefficients f and a direction φ of the frequency characteristic of the HFBF. According to FIG. 1, both the filter coefficients $f=f(\vec{v}, \vec{e})$ and the direction $\phi=\phi(\arg(\vec{v}), \arg(\vec{e}))$ are determined by a filter coefficients and filter direction control instance 7 based on the outcome of the motion 4 and edge 5 estimation instance. Similarly, the gain factor $k=k(\vec{v}, \vec{e})$ is determined by a gain factor control instance 8 based on the outcome of the motion 4 and edge 5 estimation instance.

FIG. 1 describes the most general case of motion- and edge-dependent motion blur reduction. The filter coefficients $f=f(\vec{v}, \vec{e})$, the direction of the frequency characteristic of the filter $\phi=\phi((\arg(\vec{v}), \arg(\vec{e}))$ and the gain factor $k=k(\vec{v}, \vec{e})$ may depend on the outcome of both the motion 4 and the edge 5 estimation instance. E.g., if anti-motion blur filtering is desired only for certain points of interest in the image, the filter coefficients $k=k(\vec{v}, \vec{e})$ depend on the motion and/or edge vectors, the direction $\phi=\phi(\arg(\vec{v}))$ of the frequency characteristic of the filter depends on the orientation of the motion vectors and the gain factor $k=k(|\vec{v}|, p)$ depends on the presence of edges $p(\vec{x})=p(\vec{e}(\vec{x}))$ and the length of the motion vectors $|\vec{v}|$, so that anti-motion blur filtering is only performed if there are edges in the image. The presence of edges $p(\vec{x})=p(\vec{e}(\vec{x}))$ represents a function of the edge vectors and may be obtained by sampling the edge vectors into one bit signals (there is an edge or not) and possibly dilating and corroding these signals.

Quite similar, in gain-controlled filtering the filter coefficients $f=f(\vec{v}, \vec{e})$ depend on the motion and/or edge vectors, the direction $\phi=\phi(\arg(\vec{v}))$ of the frequency characteristic of the filter depends on the motion vectors, but the gain factor $k=k(\vec{v}, \vec{e})$ depends on the inner product of edge vectors and motion vectors normalized to the length of the edge vectors, i.e.

$$k = k\left(\frac{\vec{e} \cdot \vec{v}}{|\vec{e}| \cdot |\vec{v}|} \cdot |\vec{v}|\right) = k\left(\frac{\vec{e} \cdot \vec{v}}{|\vec{e}|}\right),$$

so that filtering is only performed when the angle between edge and motion vectors is small.

In contrast, in direction-controlled filtering the direction $\phi=\phi(\arg(\vec{e}))$ of the frequency characteristic of the filter depends on the orientation of the edge vectors in order to avoid estimation errors of the motion vectors that are encountered if motion vector estimation parallel to an edge has to be performed. The filter coefficients $f=f(\vec{v}, \vec{e})$ and the gain factor $k=k(\vec{v}, \vec{e})$ once again may depend on the motion vectors and/or the edge vectors. For the gain factor $k=k(\vec{v}, \vec{e})$, a dependence $k=k(|\vec{v}|, p)$ on the presence of edges and the length of the motion vectors or a dependence $$k = k\left(\frac{\vec{e} \cdot \vec{v}}{|\vec{e}|}\right)$$

on the normalized inner product of motion and edge vectors may be imagined.

FIG. 2 depicts a second embodiment of a display system with edge-dependent motion blur reduction, in particular a low cost version. In contrast to FIG. 1, a fixed set of filter coefficients f≠f($\vec{v}$, $\vec{e}$) is used for the HBEF 6, so that the filter coefficients and filter direction control instance 7 simplifies to a filter direction control instance. Furthermore, the outcome of the motion estimation instance 4 only influences the gain factor control instance 8 and no longer the filter direction control instance 7. This set-up ensures that anti-motion blur filtering is only performed in the direction of edge vectors, where motion blur actually occurs. Filtering in parallel to an edge, with does not improve image sharpness, but enhances noise and modulates noise, is thus omitted. To further reduce the enhancement of noise, the gain factor k=k($\vec{v}$, $\vec{e}$) is controlled based on both motion and edge vectors, e.g. by choosing the gain $$k = k\left(\frac{\vec{e} \cdot \vec{v}}{|\vec{e}|}\right)$$

proportional to the inner product of both vectors.

The filter coefficients f≠f($\vec{v}$, $\vec{e}$), which are kept fixed in this set-up irrespective of the amount of motion in the present image, may be based on average values of the amount of motion or may be updated with a dwell time of several image periods. As a 1D example of such a low-cost filter, an FIR filter with taps [−1 2 −1] may be applied to adjacent pixels to approach the required inverse filter to the filter of equation 5. This low-cost version of the HFBF does advantageously avoid the poles of the theoretically needed inverse filter to the filter of equation 5 and comprises only a few filter taps.

The invention claimed is:

1. A method to reduce motion blur of images shown in a non-stroboscopic display device, the method comprising the acts of:
    calculating motion vectors depending on moving components in each image of an input video signal;
    determining edge characteristics in each image of the input video signal, wherein said edge characteristics are length of an edge and/or orientation of edge vectors;
    performing anti-motion blur filtering of the input video signal based on the calculated motion vectors and said determined edge characteristics to produce an output video signal;
    generating images on said display device depending on said output video signal,
    wherein the act of performing the anti-motion blur filtering comprises acts of:
    filtering the input video signal with a spatial filter; and
    subsequently combining the filtered input video signal with the input video signal itself to produce an intermediate video signal, wherein the act of combining comprises acts of:
    multiplying the intermediate video signal with gain factors to produce an amplified intermediate signal, and
    combining said amplified intermediate signal with said input video signal to produce said output video signal,
    wherein the spatial filter applied to the input video signal is a high spatial frequency boosting filter,
    and wherein filter coefficients of the high spatial frequency boosting filter and a direction of a frequency characteristic of the filter depend on the motion vectors, and
    wherein the gain factors depend on an inner product of edge vectors and motion on vectors normalized to the length of the edge vectors.

2. The method according to claim 1,
    wherein said length of an edge and/or orientation of the edge vectors are derived from zero-crossings of the absolute values of the first derivatives of the image signal in two orthogonal directions subtracted by fixed thresholds.

3. The method according to claim 2,
    wherein low and narrow edges are not considered in the calculation of said length of an edge and/or orientation of the edge vectors.

4. The method according to claim 1, wherein in the determining of edge characteristics, presence of edges is detected by sampling the edge vectors into binary signals.

5. The method according to claim 4,
    wherein said edge characteristics include a presence of an edge, wherein the presence of the edge is smoothed out over space by dilating and/or corroding and/or low-pass filtering said binary signals.

6. The method according to claim 1,
    wherein filter coefficients of the high spatial frequency boosting filter and a direction of a frequency characteristic of this filter depend on the motion vectors, and
    wherein the gain factors depend on a length of the motion vectors and a presence of edges.

7. A method to reduce motion blur of images shown in a non-stroboscopic display device, the method comprising the acts of:
    calculating motion vectors depending on moving components in each image of an input video signal;
    determining edge characteristics in each image of the input video signal, wherein said edge characteristics are length of an edge and/or orientation of edge vectors;
    performing anti-motion blur filtering of the input video signal based on the calculated motion vectors and said determined edge characteristics to produce an output video signal;
    generating images on said display device depending on said output video signal,
    wherein the act of performing the anti-motion blur filtering comprises acts of:
    filtering the input video signal with a spatial filter; and
    subsequently combining the filtered input video signal with the input video signal itself to produce an intermediate video signal, wherein the act of combining comprises acts of:
    multiplying the intermediate video signal with gain factors to produce an amplified intermediate signal, and
    combining said amplified intermediate signal with said input video signal to produce said output video signal,
    wherein the spatial filter applied to the input video signal is a high spatial frequency boosting filter,
    wherein a direction of the frequency characteristic of the high spatial frequency boosting filter depends on an orientation of the edge vectors,
    wherein the filter coefficients of the high spatial frequency boosting filter depend on the motion vectors, and
    wherein the gain factors depend on the motion vectors and/or the edge vectors,
    and wherein the gain factors depend on an inner product of edge vectors and motion vectors normalized to the length of the edge vectors.

8. The method according to claim 1, wherein a direction of the frequency characteristic of the high spatial frequency boosting filter depends on an orientation of the edge vectors,
    wherein the filter coefficients of the high spatial frequency boosting filter depend on the edge vectors, and wherein the gain factors depend on the motion vectors and/or edge vectors.

9. The method according to claim 1,
wherein a fixed set of filter coefficients for the high spatial frequency boosting filter is used, and
wherein a direction of the frequency characteristic of the spatial filter depends on an orientation of the edge vectors, and
wherein the gain factors depend on the motion vectors and/or edge vectors.

10. The method according to claim 7, wherein the gain factors depend on the length of the motion vectors and a presence of edges.

11. A non-stroboscopic display device, comprising:
means for calculating motion vectors in each image of an input video signal;
means for anti-motion blur filtering the input video signal depending on said calculated motion vectors to produce an output video signal,
means for displaying the images of the output video signal on a display panel, and
means for determining edge characteristics of each image of the input video signal, wherein said edge characteristics are length of an edge and/or orientation of edge vectors,
wherein said means for anti-motion blur filtering the input video signal depends on both the calculated motion vectors and the determined edge characteristics,
wherein said anti-motion blur filtering means comprises:
a spatial filter for filtering the input video signal; and
combining means for combining the filtered input video signal with the input video signal to produce an intermediate video signal, wherein the combining means comprises:
a multiplier for multiplying the intermediate video signal with gain factors to produce an amplified intermediate signal; and
a combiner for combining said amplified intermediate signal with said input video signal to produce said output video signal,
wherein the spatial filter applied to the input video signal is a high spatial frequency boosting filter,
and wherein filter coefficients of the high spatial frequency boosting filter and a direction of a frequency characteristic of the filter depend on the motion vectors, and
wherein the gain factors depend on an inner product of edge vectors and motion vectors normalized to the length of the edge vectors.

12. A method for reducing motion blur of images shown in a non-stroboscopic display device, the method comprising the acts of:
calculating motion vectors depending on moving components in each image of an input video signal;
determining edge characteristics in each image of the input video signal;
performing anti-motion blur filtering of the input video signal with a high spatial frequency boosting filter based on the calculated motion vectors and said determined edge characteristics to produce an output video signal, wherein filter coefficients of the high spatial frequency boosting filter and a direction of a frequency characteristic of the filter depend on the motion vectors; and
generating images on said display device depending on said output video signal,
wherein the act of performing the anti-motion blur filtering comprises an act of combining the filtered input video signal with the input video signal to produce an intermediate video signal,
wherein the act of combining comprises acts of:
multiplying the intermediate video signal with gain factors to produce an amplified intermediate signal, and
combining said amplified intermediate signal with said input video signal to produce said output video signal,
and wherein the gain factors depend on an inner product of edge vectors and motion vectors normalized to a length of the edge vectors.

13. A method for reducing motion blur of images shown in a non-stroboscopic display device, the method comprising the acts of:
calculating motion vectors depending on moving components in each image of an input video signal;
determining edge characteristics in each image of the input video signal, wherein said edge characteristics are length of an edge and/or orientation of edge vectors;
performing anti-motion blur filtering of the input video signal based on the calculated motion vectors and said determined edge characteristics to produce an output video signal;
generating images on said display device depending on said output video signal,
wherein the act of performing the anti-motion blur filtering comprises acts of:
filtering the input video signal with a spatial filter; and
subsequently combining the filtered input video signal with the input video signal itself to produce an intermediate video signal,
wherein the act of combining comprises acts of:
multiplying the intermediate video signal with gain factors to produce an amplified intermediate signal, and
combining said amplified intermediate signal with said input video signal to produce said output video signal, and
wherein the gain factors depend on the motion vectors and/or the edge vectors, and wherein the gain factors depend on an inner product of edge vectors and motion vectors normalized to the length of the edge vectors.

* * * * *